United States Patent [19]

Gillberg-Laforce et al.

[11] Patent Number: 5,192,621
[45] Date of Patent: Mar. 9, 1993

[54] ARTICLES CONTAINING SIDE CHAIN POLYMERIC ULTRAVIOLET PROTECTING AGENTS

[75] Inventors: Gunilla E. Gillberg-Laforce, Summit; Josefina L. Pruksarnukul, Montclair, both of N.J.

[73] Assignee: Hoechst Celanese Corp., Somerville, N.J.

[21] Appl. No.: 865,427

[22] Filed: Apr. 9, 1992

Related U.S. Application Data

[62] Division of Ser. No. 646,965, Jan. 28, 1991, Pat. No. 5,145,928.

[51] Int. Cl.$^5$ .............................................. B32B 27/06
[52] U.S. Cl. .................................... 428/480; 526/313; 526/326; 525/326.1; 525/329.5; 427/160
[58] Field of Search ..................... 428/480, 411.1, 704, 428/483; 526/313, 326; 525/326.1, 329.5; 524/338; 427/160

[56] References Cited

U.S. PATENT DOCUMENTS

| | | | |
|---|---|---|---|
| 3,957,813 | 5/1976 | Irick, Jr. et al. | 524/94 |
| 4,265,804 | 5/1981 | Zannucci et al. | 524/94 |
| 4,833,211 | 5/1989 | Rogger et al. | 526/313 |

Primary Examiner—Patrick J. Ryan
Assistant Examiner—N. Edwards
Attorney, Agent, or Firm—P. S. Kalyanaraman

[57] ABSTRACT

This invention provides novel polymers that contain, in their side chains, 4-benzoyloxyphenyl moieties. These polymers have utility as coating to protect polyester materials from damage due to ultraviolet radiation.

6 Claims, No Drawings

ARTICLES CONTAINING SIDE CHAIN POLYMERIC ULTRAVIOLET PROTECTING AGENTS

This is a divisional of copending application Ser. No. 07/646,965 filed Jan. 28, 1991, now U.S. Pat. No. 5,145,928.

The present invention relates to side chain polymers containing 4-benzoyloxyphenyl moieties in the side chain, and coatings therefrom as prophylactic agents against ultraviolet radiation especially for plastic materials.

BACKGROUND OF THE INVENTION

Plastic materials, particularly polyester materials, are being used more and more in applications such as architectural windows, viewing media, glazing media, as well as in automotive glazing products. Their superior optical clarity, and relatively low cost make them attractive, suitable, and preferred for such applications.

A drawback of polyester films and fibers is their susceptibility to damage by ultraviolet radiation, particularly over the long periods of exposure that these applications normally require Accordingly, several methods have been tried in the past to improve the stability of polyester products to ultraviolet radiation. These methods generally revolve around using an additive or a coating that absorbs in the ultraviolet region, with negligible absorption in the visible region. Such a selective absorption would improve ultraviolet stability, but will not reduce optical clarity of the polyester products significantly.

Some additives that are used as ultraviolet protecting agents are described by D. A. Gordon in "Light Stablilizers", *Encyclopedia of Basic Materials for Plastics*, H. R. Simonds and J. M. Church Eds., Reinhold, New York, 1967. The disadvantages with the use of additives include high levels of concentration needed for adequate protection, uneven distribution of the additives in the polymer, potential migration, and low level of protection offered. Therefore, generally polymeric materials that can form clear coatings and also absorb ultraviolet radiation are preferred in the industry.

Polymeric coatings based on main chain aromatic polyesters are described by S. M. Cohen et al, "Transparent Ultraviolet-barrier Coatings", *Journal of Polymer Science*, Part A-1, Volume 9, pages 3263–3299 (1971). These main chain polyesters, upon ultraviolet radiation, undergo photo-Fried rearrangement to provide polymeric o-hydroxybenzophenones, as described below:

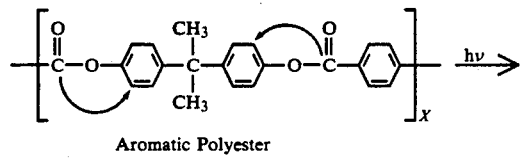

Aromatic Polyester

-continued

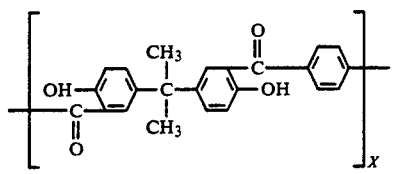

Polymeric o-hydroxy benzophenone

Several of these main chain polyesters are commercially available, some of them under the term polyarylates, such as, for example, the Durel ® polyarylate resin (sold by Hoechst Celanese Corporation, Engineering Resins Division, Chatham, N.J.). Such main chain polyesters produce benzophenones on photo-Fries rearrangement as the equation above shows. Benzophenones and benzophenone derivatives are excellent ultraviolet screens. Unfortunately, such main chain aromatic polyesters have poor solubility in common organic solvents, especially solvents of low toxicity, and no dispersibility in aqueous solvent systems.

Accordingly, it is an object of this invention to provide polymeric compositions that have very good solubility in common organic solvents as well as dispersibility in aqueous solvent systems.

A further object is to provide coatings for plastic products, particularly for polyester films, textiles, and the like, the coatings offering excellent protection to the underlying polyester.

Yet another object is to provide coatings that maintain the clarity and transparency of polyester films, while at the same time offering excellent stability toward ultraviolet radiation.

These and other objects as well as the advantages of the present invention shall become apparent from the accompanying description, examples and claims.

SUMMARY OF THE INVENTION

The present invention is directed to polymers that contain, as side chains, 4-benzoyloxyphenyl moieties. The preferred polymer backbone is a vinyl polymer. An example of a polymer of the present invention is represented by the following structure:

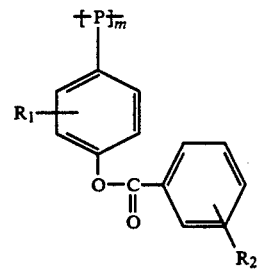

where P represents the polymer main chain, $R_1$ could be the same or different and selected from the group consisting of H, alkyl containing from 1 to 6 carbon atoms, cycloalkyl containing from 4 to 6 carbon atoms, and aralkyl containing from 7 to 10 carbon atoms, and $R_2$ could be the same or different, and is selected from the group consisting of OH, $SO_3H$, and the functionalities mentioned above for $R_1$. The number of $R_1$ substituents could be from 1 to 4, and $R_2$ could number from 1 to 5. If at least one group represented by $R_2$ is OH, it is preferable to have that OH on the 2-position of the ring, namely the ortho position with respect to the carbonyl group. The value of m could range from about 50 to 500. A representative of the preferred composition, for example, can be written as a polystyrene shown below:

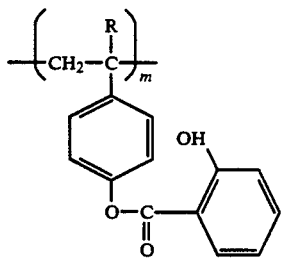

where R could be the same or different, and is selected from the groups represented by $R_1$ described above, and m is the same as before.

In another embodiment, it is possible to have the 4-benzoyloxyphenyl side chain as part of a copolymer composition, for example, a copolymer of a vinyl monomer containing the 4-benzoyloxyphenyl moiety with other vinyl monomers. If the comonomer is a styrenic monomer, the copolymer may be represented by:

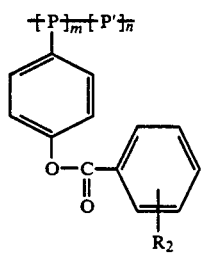

where P, $R_1$, $R_2$, and m are the same as above, P' represents the styrenic comonomer, and the value of n is such that the intended properties of the polymer are still preserved. Also care should be taken such that the comonomer composition does not interfere with or affect the desired properties of the 4-benzoyloxyphenyl functionality in the final composition detrimentally.

Polymers containing the 4-benzoyloxyphenyl moieties in their sidechains have been found to have excellent solubility in common organic solvents as opposed to polyarylates described earlier. In addition, several of the compositions where at least one of $R_2$ is a hydroxyl group and is ortho to the carbonyl exhibit solubility in aqueous formulations making it possible to prepare coatings from non-toxic and less expensive formulations. Whatever is the nature of the solvent used, high solubilities of these compositions enable coating fairly thick coatings on polyester product using simple techniques.

When polyester coated with the above polymers is exposed to ultraviolet radiation, the side chains in the polymer can undergo photo-Fries rearrangement thereby producing hydroxybenzophenone moieties in the side chains as represented below:

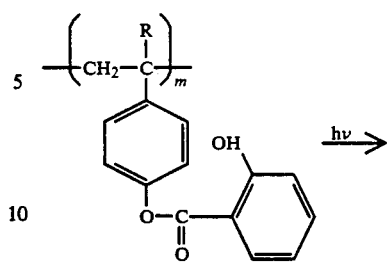

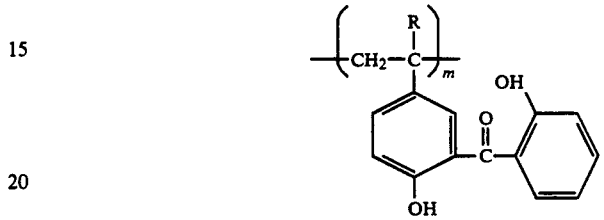

However, the presence of the hydroxyl ortho to the carbonyl group, in itself gives a rapid relaxation path for absorbed ultraviolet radiation. These hydroxybenzophenones offer stability toward ultraviolet radiation, thereby protecting the underlying polyester. If the polymer contains side chains where at least one of $R_2$ is a hydroxyl, and is ortho to the carbonyl, the product after ultraviolet radiation and photo-Fries rearrangement now has two hydroxyl groups, at the 2 and 2' positions of the benzophenone. This derivative has been found to have surprisingly superior ultraviolet protection ability. Comparative test of the preferred polymers of the present invention with polyarylates demonstrate vast improvements in ultraviolet protection offered by the former.

DETAILED DESCRIPTION OF THE PREFERRED EMBODIMENTS

The novel polymers of the present invention carry side chains that contain 4-benzoyloxyphenyl moieties in them. The preferred polymer backbone is a vinyl polymer, and a representative of the preferred polymer can be represented as a polystyrene as shown below:

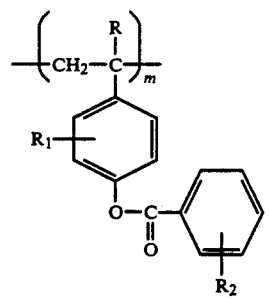

where R and $R_1$ could be the same or different and selected from the group consisting of H, alkyl containing from 1 to 6 carbon atoms, cycloalkyl containing from 4 to 6 carbon atoms, and aralkyl containing from 7 to 10 carbon atoms, and $R_2$ could number from 1 to 5, and is selected from the group consisting of OH, $SO_3H$, and the functionalities mentioned above for $R_1$. The number of $R_1$ substituents could be from 1 to 4. If at least one group represented by $R_2$ is OH, it is preferable to have that OH on the 2-position of the ring, namely the ortho position with respect to the carbonyl group. The value of m could range from about 50 to about 500. If at least one group represented by $R_2$ is -OH, it is preferable to have that -OH on the 2-position of that ring, namely the ortho position with respect to the carbonyl group.

A preferred process to synthesize polymers of the present invention involves ester interchange on a suitable poly-4-acetoxystyrene using a suitably substituted aromatic acid, as represented below:

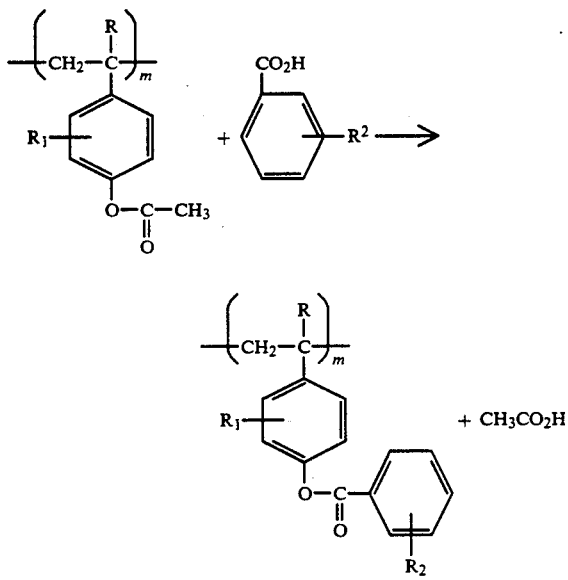

where R, $R_1 R_2$, and ma are as described above. Copolymers can also be synthesized by a similar process, starting with copolymers of 4-acetoxystyrene and suitable aromatic acid. A typical synthetic process can be exemplified by the synthesis of poly-4-(2'-hydroxybenzoyloxy)-styrene from poly-4-acetoxystyrene and salicyclic acid:

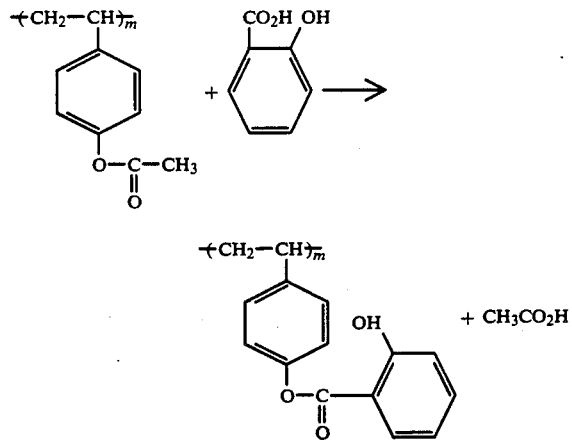

where m is described above. This ester interchange reaction can be run in a solvent, preferably a hydrocarbon solvent such as toluene, xylene, and the like. An acid catalyst may be used; typical catalysts are methane sulfonic acid, p-toluenesulfonic acid, hypophosphorus acid, and the like, or mixtures thereof. The reaction time varied with the molecular weight of the starting poly-4-acetoxystyrene as well as with the catalyst.

In a typical synthesis, poly-4-acetoxystyrene (supplied by Hoechst Celanese Corporation, Corpus Christi, Tex.) and salicyclic acid were mixed in a 1:1 molar ratio of polymer repeat unit and salicyclic acid and dissolved in o-xylene. The solution was kept stirring under nitrogen, while the catalyst methane sulfonic acid was added, and the mixture heated to reflux. The distillate containing acetic acid was removed, and the reaction cooled to room temperature. The product was isolated by distilling off the solvent, and then purified by dissolving in acetone and precipitating into water. The dried product could be characterized by analytical techniques such as nuclear magnetic resonance spectroscopy and infrared spectroscopy, which also indicated the percentage of ester interchange that occurred on the starting polymer. Polymers of different molecular weight could similarly be synthesized by using different molecular weight poly-4- acetoxystyrene.

The products of the reaction were found to have good solubility in common organic solvents such as ketones, esters, halogenated hydrocarbons, amides, and the like. Some polymers could also be dispersed in water. Thus, for example, the polymer prepared by ester interchange on poly-4-acetoxystyrene using a mixture of salicylic acid and 2-sulfobenzoic acid could be dispersed in water, and used as an aqueous dispersion. Water dispersibility could also be improved by using a higher molecular weight poly-4-acetoxystyrene, lowering the degree of substitution, as well as by washing the product with an aqueous base after isolation.

The polymers of the present invention could be cast from a solution in a suitable solvent or solvent mixture or from an aqueous dispersion. The enhanced solubility of these polymers in common organic solvents as opposed to polyarylates allows casting thicker films on substrates. Any conventional coating technique can be employed such as dip coating, brush coating, wire coating, bar coating, and the like. In a typical coating process, the polymer prepared as above was dissolved in cyclohexanone to make a 10 weight % solution, and coated on a polyethylene terephthalate (PET) film using a Meyer wire wound coater (supplied by Pacific Scientific, Silver Springs, Md.). The coating was dried for one hour at about 100° C. Various thicknesses of the coating could be achieved depending upon the concentration of the solution, molecular weight of the polymer, and the wire coater used. Thus, for example, using wire coater #16, and a 10 weight % solution of the above polymer in cyclohexanone, one could get coating thicknesses ranging from about 2 microns to about 7 microns. The coated films had excellent clarity and were virtually colorless. For control, PET films were coated with the Durel 400 ® resin; these control coatings were also clear and virtually colorless. Coatings of the Durel 400 ® resin are currently used as ultraviolet protecting films.

The coated PET films showed excellent adhesion and good ultraviolet protection ability. Transmission at 595 nm was excellent, usually more than 80%. Comparative tests were run comparing the inventive polymer-coated PET film with the Durel 400 ® resin-coated PET film as well as an uncoated PET film. The samples were subjected to irradiation from a 450 watt Hg lamp under identical conditions. The uncoated PET control film started becoming opaque after about 48 hours, with transmission steadily decreasing. By 96 hours it was mostly opaque, the original transmission of about 87% had decreased to about 24%. The Durel 400® resin-coated PET film performed better; the film became more yellow after 96 hours of irradiation; the transmission decreased from about 88.0% to about 50.0%. In addition the Durel 400® resin film peeled off easily from the underlying PET film indicating loss of adhesion. PET film coated with polymers of the present invention exhibited the best performance. Their color changes ranged from none to slightly yellow; transmission stayed around 80% or above even after 96 hours of irradiation, demonstrating superior ultraviolet protection to the underlying polyester. In addition, adhesion stayed excellent. In fact, coatings from the polymers of the present invention offered superior protection to polyester than the Durel 400® resin coating even when the thickness of the former was less.

The following examples are provided in order to further illustrate the present invention. The examples are in no way meant to be limiting, but merely illustrative.

EXAMPLES

Example 1

Preparation of Poly-4-(2'- hydroxybenzoyloxy) -styrene

The purpose of this reaction was to obtain a polymer by ester-interchange of the poly-4-acetoxystyrene (considering M. W. 162.0 of the repeat unit), with a benzoic acid derivative. This reaction was done taking 1.0:1.0 mole ratio between the poly-4-acetoxystyrene and salicylic acid. The catalyst was calculated to be 2.5 mole percent of the ester groups. In a 300 ml 3 neck flask, fitted with a Dean-Stark adapter, stirrer and thermometer, poly-4-acetoxystyrene (M. W. 8,400, supplied by Hoechst Celanese Corporation, Corpus Christi, Tex.) (9.04 grams, 0.0558 moles) was dissolved in 125 ml o-xylene and kept stirring under nitrogen. Salicylic acid (7.71 grams, 0.0558 moles) was added followed by the catalyst methane sulfonic acid (0.19 grams). The mixture was heated, with stirring, to reflux, and the distillate which contained acetic acid in o-xylene was removed and replenished with fresh o-xylene. The reaction was over after 48 hours. The solvent was then distilled off. The residue was dissolved in acetone and precipitated with addition of water. To purify the polymer, the product was washed in acetone and precipitated in water twice. NMR analysis of the dried product showed 67.8% conversion into the desired product, which had a melting point of >320.2° C. The product was tan in color, and had excellent solubility in common organic solvents such as acetone and cyclohexanone; a solution in cyclohexanone was used in coating experiments.

Example 2

Preparation of Poly-4-(2'hydroxybenzoyloxy-styrene

In this reaction an extra catalyst hypophosphorous acid was added, to improve the color of the product, and reaction time. Poly-4-acetoxystyrene (M. W. 8,400, 9.04 grams, 0.0558 moles) was dissolved in 125 ml o-xylene and kept stirring under nitrogen. Salicylic acid (7.71 grams, 0.0558 moles) was added followed by the catalysts methane sulfonic acid (0.19 grams) and hypophosphorous acid (0.10 grams). The mixture was reacted as in Example 1 for 32 hours. The product was isolated as before and had a melting point of 267.5 C. NMR analysis showed a 53.7% conversion. Product was lighter than that in Example 1.

Example 3

Preparation of Poly-4-(2'hydroxybenzoyloxy)-styrene:

In this example the same mole ratios and the two catalysts in Example 2 were used, but the reaction time was increased, in order to obtain a higher degree of transesterification. Poly-4-acetoxystyrene (M. W. 8,400, 11.34 grams, 0.07 moles) was dissolved in 125 ml o-xylene and kept stirring under nitrogen. Salicylic acid (9.67 grams, 0.07 moles) was added followed by both catalysts, methane sulfonic acid (0.24 grams) and hypophosphorous acid (0.12 grams). The mixture reacted for 48 hours. The product was isolated as before and had a melting point of 215.0° C. NMR analysis showed a 95.0% conversion. The product had a lighter cream color.

Example 4

Preparation of Poly-4-(2'-hydroxybenzoyloxy)-styrene

In this sample the poly-4-acetoxystyrene used had a much higher molecular weight, in order to obtain a polymer with better mechanical properties. Poly-4-acetoxystyrene (M. W. 217,000, 4.05 grams, 0.025 moles) was dissolved in 100 ml o-xylene and kept stirring under nitrogen. Salicylic acid (3.45 grams, 0.025 moles) was added followed by catalysts, methane sulfonic acid (0.096 grams) and hypophosphorous acid (0.041 grams). The mixture was reacted for 48 hours. The product was not soluble in acetone. It was necessary to neutralize the product with base to obtain acetone solubility. This yielded after the first precipitation, a water dispersible product which could not be precipitated from water and had to be recovered by evaporation. The product had a melting point of >295.0° C. NMR analysis showed a 50.0% conversion. The product had a light tan color.

Example 5

Preparation of Poly-4-(2'-hydroxybenzoyloxy)-4-(2'-sulfonatobenzoyloxy)-styrene, [90:10]

In this mixture the mole ratios between the poly-4-acetoxystyrene and salicylic acid was changed to be 1.0:0.9 and adding a 0.1 mole ratio of benzenesulfonic acid, to obtain a polymer with a better water solubility. Poly-4-acetoxystyrene (M. W. 8,400, 4.05 grams, 0.025 moles) was dissolved in 100 ml o-xylene and kept stirring under nitrogen. Salicylic acid (3.1 grams, 0.0225 moles) and benzenesulfonic acid (0.56 grams, 0.0025 moles) were added followed by both catalysts, methane sulfonic acid (0.096 grams) and hypophosphorous acid (0.041 grams). This mixture was reacted for 1½ hours. The product was isolated as in Example 2. It was suspended in water and neutralized with 50% aqueous NaOH to pH 7-8, when it became completely dispersed in the aqueous medium. This aqueous dispersion could be used for coating experiments. The product had a melting point of 198.5° C. NMR analysis showed a 84.0% conversion. This product was off white in color.

Example 6

Preparation of Poly-4-(2'-hydroxybenzoyloxy)-styrene

In this reaction the mole ratios between poly-4-acetoxystyrene and salicylic acid were changed to 1.0:0.5. Poly-4-acetoxysterene (M. W. 50,000, 4.05 grams, 0.025 moles) was dissolved in 100 ml o-xylene and kept stirring under nitrogen. Salicylic acid (1.73 grams, 0.025 moles) was added followed by the catalyst methane sulfonic acid (0.096 grams). This mixture was reacted for 28 hours. The product was isolated as before and had a melting point of 195.0° C. NMR analysis showed a 43.0% conversion. This product was light colored and had good water dispersibility.

Example 7

Coating and Irradiation Experiments

The product of Example 6 was dissolved in cyclohexanone to make a 10 weight % solution with slight heating on a hot plate. The solution was filtered through an Acrodisc CR ® brand Teflon ® filtration membrane (pore size: 0.2 microns), added over a film of PET (the Hostaphan 4000 ® brand PET, supplied by Hoechst Celanese Corporation, Somerville, N.J.) of thickness 0.18 micron, and was spread uniformly using a Meyer wire would coater #16. The film was then dried at about 100° C. for one hour. A clear film with a coating thickness of about 2 microns, as measured by Sloan Dektak II profilometer, resulted. The transmission of the film at 595 nm was determined to be 87.9% using a Perkin Elmer Lambda 9 UV/VIS/NIR spectrophotometer.

Two films were used as controls for the following irradiation experiments. Control I was an uncoated PET film with a transmission at 595 nm of 87.1%. Control II was a PET film coated with about 7 microns thick film of the Durel 400 ® polyarylate resin with a transmission of 87.5%.

Ultraviolet Exposure

The above three samples were exposed to radiation from a 450 watt Hg lamp held at about 7-8 inches from the samples, while the films were kept flushed with nitrogen to remove any ozone formed during the exposure. The samples were irradiated continuously for a total period of 96 hours with periodic visual inspection.

Control I, the uncoated PET film, started to degrade after 48 hours by becoming slightly opaque, yellow after 72 hours, and very yellow and opaque when the experiment was over by 96 hours. Transmission had decreased to 24.2%. Control II, the Durel 400 ® resin-coated PET film, turned yellow and opaque at the end of 96 hours, with a transmission of 50.4%. In addition, the Durel 400 ® resin coating peeled off easily from the underlying PET film, indicating poor adhesion. The sample coated with the polymer of Example 6 stayed clear with very little discoloration; transmission was 86.3%, and adhesion remained excellent.

Table 1 lists results of irradiation experiments on PET films coated with several poly-4-(2'-hydroxybenzoyloxy)-styrene derivatives.

TABLE I

Results after 96 hours of Ultraviolet Irradiation on PET films

| Expt. No. | Polymer Coating on PET | Transmission at 595 nm | | Appearance | |
|---|---|---|---|---|---|
| | | Before Exposure | After Exposure | Before Exposure | After Exposure |
| 1 | Polymer of Example 1 | 86.3% | 78.4% | clear | clear; very little discoloration |
| 2 | Polymer of Example 2 | 87.1% | 81.6% | clear | some portions not clear |
| 3 | Polymer of Example 3 | 87.0% | 80.0% | clear | clear; yellow |
| 4 | Polymer of Example 4 | 87.1% | 79.0% | clear | opaque; not yellow |
| 5 | Polymer of Example 5 | 87.1% | 77.0% | clear | clear; yellow |
| 6 | Polymer of Example 6 | 87.9% | 86.3% | clear | clear; very little discoloration. |

What is claimed is:

1. A polyester substrate coated with a composition comprising polymers that contain, in their side chains, 4-benzoyloxyphenyl moieties, and being represented by the formula:

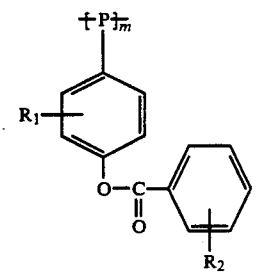

wherein P is the polymer main chain unit, $R_1$ numbers from 1 to 4 substituents, could be the same or different, and is selected from the group consisting of H, alkyl containing from 1 to 6 carbon atoms, cycloalkyl containing from 4 to 6 carbon atoms, and aralkyl containing from 7 to 10 carbon atoms; and $R_2$ numbers from 1 to 5 substituents, could be the same or different, and is selected from the group consisting of OH, $SO_3H$, H, alkyl containing from 1 to 6 carbon atoms, cycloalkyl containing from 4 to 6 carbon atoms, and aralkyl containing from 7 to 10 carbon atoms and m ranges from about 50 to 500.

2. The composition according to 1, wherein said polyester is polyethylene terephthalate.

3. The composition according to 1, wherein $R_1=H$, and $R_2$ numbers one and is a hydroxyl.

4. The composition according to 1, wherein $R_1=H$, and $R_2$ numbers one and is $SO_3H$.

5. The composition of claim 3 or 4, wherein $R_2$ is located ortho with respect to the carbonyl group.

6. The composition according to 1, wherein the thickness of said coating ranges from about 1 micron to about 50 microns.

* * * * *